Sept. 20, 1971  R. C. DEETER ET AL  3,605,910
AUGER APPARATUS DRIVE SYSTEM
Filed Sept. 26, 1969  5 Sheets-Sheet 1
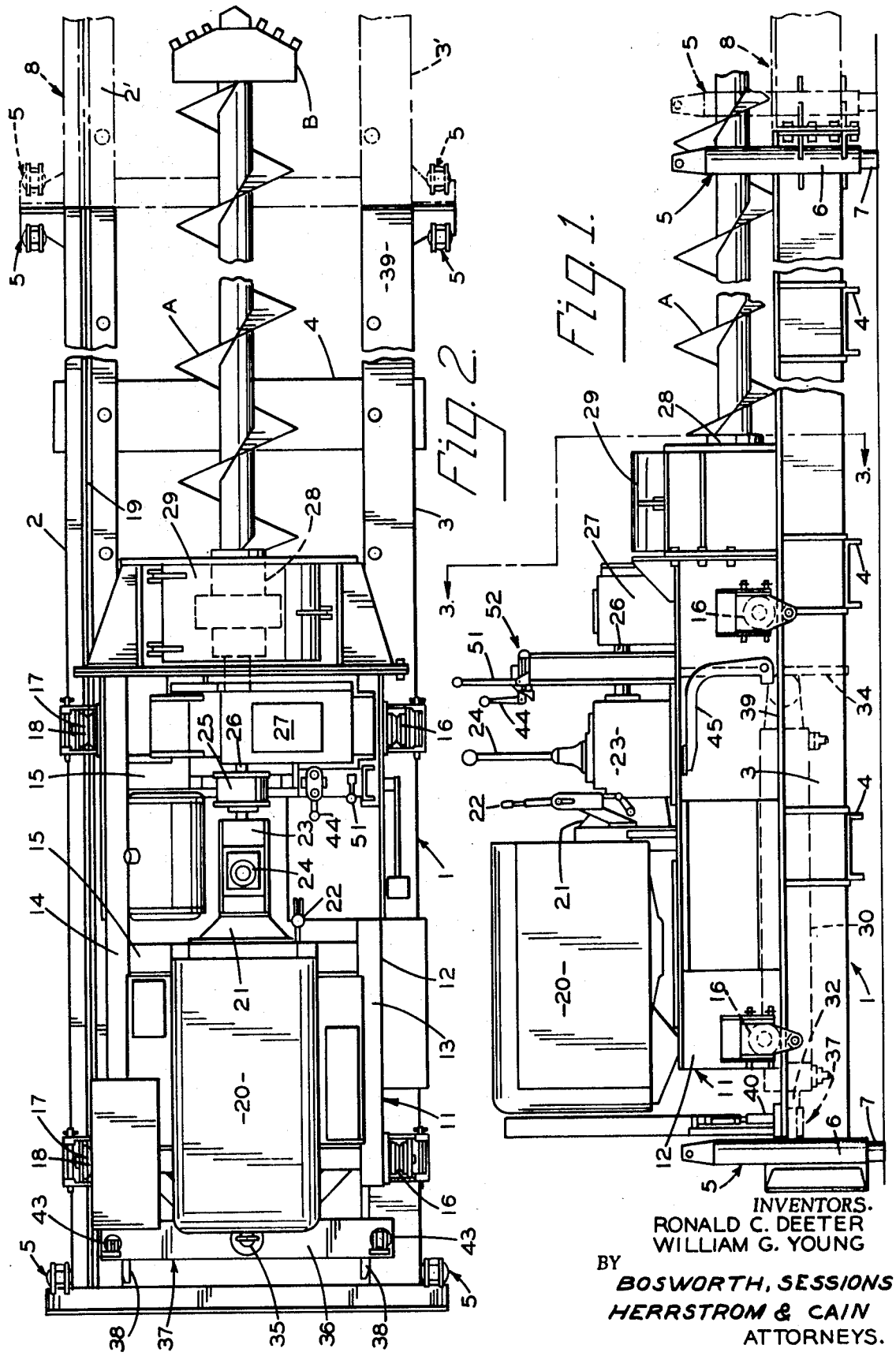
INVENTORS.
RONALD C. DEETER
WILLIAM G. YOUNG
BY
BOSWORTH, SESSIONS
HERRSTROM & CAIN
ATTORNEYS.

INVENTORS.
RONALD C. DEETER
WILLIAM G. YOUNG
BY
BOSWORTH, SESSIONS
HERRSTROM & CAIN
ATTORNEYS.

INVENTORS.
RONALD C. DEETER
WILLIAM G. YOUNG
BY
BOSWORTH, SESSIONS
HERRSTROM & CAIN
ATTORNEYS.

United States Patent Office 3,605,910
Patented Sept. 20, 1971

3,605,910
AUGER APPARATUS DRIVE SYSTEM
Ronald C. Deeter and William G. Young, Salem, Ohio, assignors to The Salem Tool Company, Salem, Ohio
Filed Sept. 26, 1969, Ser. No. 861,340
Int. Cl. E21c 5/10
U.S. Cl. 173—4
17 Claims

ABSTRACT OF THE DISCLOSURE

An auger machine, such as a trench drill, having an auger carriage that is moved by a cylinder that can force the auger forward into the materal being drilled by supplying the cylinder with hydraulic liquid under pressure and at a rate corresponding to the rate of auger penetration, means being provided to insure that for the rate of penetration the pressure and power requirements will be within the capabilities of the apparatus, and that little if any liquid at high pressure is vented with loss of energy as waste heat. The hydraulic system includes a variable displacement pump for supplying liquid to the cylinder on a selected side of the piston at a controlled desired rate, means for controlling the pump to control the rate at which fluid is supplied by the pump, and means for limiting the maximum pressure of the hydraulic liquid to an upper limit correlated to the rate of penetration of the auger, to insure that maximum pressures are within the capabilities of the apparatus, and maximum pump power requirements are within the capabilities of the power supply means such as a power takeoff from an internal combustion engine driving the auger.

Field of the invention

This invention relates generally to auger apparatus, and more particularly to auger apparatus comprising improved means for forcing the auger forwardly to penetrate the material being cut. While the invention may be used for other purposes, it provides exceptional advantages when employed in the type of auger apparatus known as a trench drill for drilling generally horizontal holes under streets and roadways and the like, which apparatus may be adapted if desired to install conduit sections while the hole is drilled.

In general, apparatus of this type comprises an auger embodying a cutting head of relatively large diameter connected to and rotationally driven by a string of one or more helically vaned auger sections driven from a carriage, movable longitudinally on a frame, supporting the driving end of the auger and carrying a power source for rotating the cutting head. Means operating between the frame and carriage moves the carriage forward on the frame to cause the cutting head to penetrate the earth, and to move the carriage rearwardly on the frame to retract the cutting head or to permit an auger section to be inserted in the string between the cutting head and the carriage. Such means usually comprises one or more cylinders, each usually designated a crowd cylinder, having a piston and rod operating between the carriage and the frame. Usually hydraulic fluid is supplied to the cylinder to cause desired movements between the cylinder and the piston by a system embodying a pump driven by a suitable power source, which may be a power takeoff from the engine driving the auger, or an independently operating power source.

As the cutting head penetrates the material to be cut, it may encounter rock or other material providing high resistance to penetration of the cutting head. The force exerted by the crowd cylinder must be greatly increased.

The increased pressure of hydraulic fluid required in the crowd cylinder under these conditions causes difficulties in prior aparatus.

The power that can be applied to the pump from the power source driving the pump is limited, and in prior apparatus the power source or pump can become overloaded and harmed, particularly if the rate of penetration is not properly decreased. Moreover, when the usual prior hydraulic system is used embodying a constant volume pump with a directional control valve supplying fluid to the crowd cylinder, the pump supplies a relatively high volume of liquid at a constant rate, and excess hydraulic liquid that is not directed into the crowd cylinder must be and is dumped through a relief valve at the high pressure utilized to cause auger penetration, thus creating excessive heat that must be removed by suitable cooling means and that also represents a substantial loss of energy. Furthermore, if the power source, as is the usual case, is a power takeoff from an internal combustion engine that rotates the auger, this power is taken from the power available for rotating the auger during drilling. High pressure and high volume of hydraulic fluid produced by the pump require a considerable amount of power from the power source; and when excessively high pumping power is required for penetrating force or is wasted as heat, drilling effectiveness and efficiency is impaired.

Summary of the invention

The present invention provides auger apparatus, preferably a trench drill of the type discussed above, that overcomes such disadvantages and makes possible the application of desired penetrating force by a crowd cylinder even though high resistance to penetration of the auger cutting head is encountered, without utilizing excessive power to drive the pump and without generation of wasteful heat.

According to the present invention such auger apparatus comprises a hydraulic system embodying a variable displacement pump that can be controlled to direct to the crowd cylinder hydraulic fluid at a relatively high pressure at a lower controlled rate required to match the penetration rate, and at a low pressure and relatively high rate for retraction of the carriage supporting the driving end of the auger.

This system also embodies means for limiting the power input to the pump to a predetermined limit so as to prevent excessive drain of power from the power source.

It is an object of the invention to provide auger apparatus that overcomes the disadvantages indicated above of prior apparatus.

It is another object of the invention to provide auger apparatus embodying as many as desired of the advantages summarized above.

It is a further object of the invention to provide auger apparatus that permits a wide range of pressures to be applied to the crowd cylinder without excessive use of power, the generation of excessive heat, or utilization of excessively high pressures or forces.

A further object is the provision of auger apparatus that is dependable in operation, requires little maintenance and can be manufactured at reasonable cost.

Brief description of the drawings

The above advantages, features and objects will become more clearly apparent from the following description of two preferred embodiments of the invention in connection with the accompanying drawings in which:

FIG. 1 is a side elevation illustrating one form of trench drill comprising the present invention;

FIG. 2 is a plan of the apparatus of FIG. 1;

Description of preferred embodiments

Figure 3:
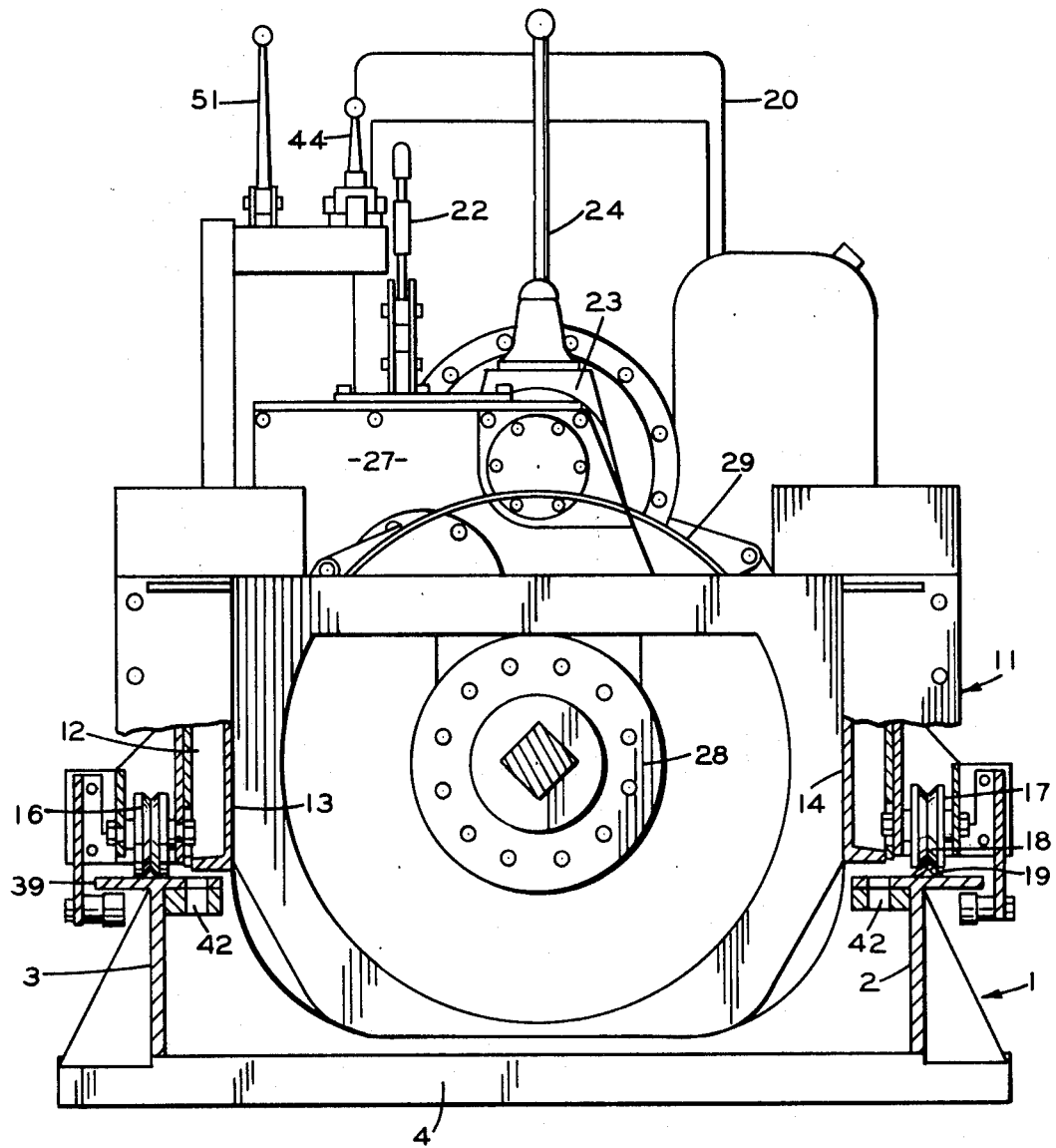
FIG. 3 is an elevation from line 3—3 of FIG. 1.

The illustrated trench drill comprises a stationary rigid main frame 1 from which an auger A, having a known cutting head B, is supported for longitudinal movement and rotated.

The frame comprises a pair of spaced longitudinally extending massive parallel beams 2 and 3 joined by cross members 4. Near its ends, at corresponding positions at either side, the main frame is fixed to four vertical hydraulic jacks 5 each of which comprises a vertical outer tubular member 6 rigidly fixed to the main frame and having a telescoping inner member 7 (FIG. 1) that can be moved downwardly out and upwardly into member 6 by suitable known means requiring no further description to adjust the level of the main frame 1 as required.

The main frame is adapted to have additional frame sections 8 attached to its forward end to lengthen the frame and as required; these sections are bolted to the main frame or to each other in a known manner, and each has a proper number of jacks 5 on its sides to adjust the level and elevation of the frame sections to correspond to those of the main frame.

Frame 1 also supports a carriage 11 for guided movement longitudinally on main frame members 2 and 3 and frame members 2′ and 3′ of additional frame sections 8, between an extreme rear position shown in full lines in FIG. 1 and to a desired forward position. The carriage thus can move forward to advance the auger A for penetration, and can move rearward to retract the auger or permit insertion or removal of auger sections in a known manner.

Carriage 11 comprises a rigid frame 12 made up of longitudinally extending members 13, 14 and cross members 15, and on each side has wheels 16, 17 that ride on main frame members 2 and 3; on at least one side the wheels have circumferential grooves 18 that engage a guide strip 19 on the main frame member.

An internal combustion engine 20 such as a diesel engine constituting the power source for rotating and moving auger A longitudinally, is fixed on carriage 11. It rotates, through a conventional mechanical clutch 21 having a clutch control lever 22, a conventional shiftable transmission 23 having shift lever 24, and conventional flexible coupling 25, an input shaft 26 of a reduction gear housing 27 that drives a driving head 28 that rotates the auger A. The gearbox and carriage also carry a housing 29 from which spoil or cut material conveyed by the auger is discharged.

Figure 5:
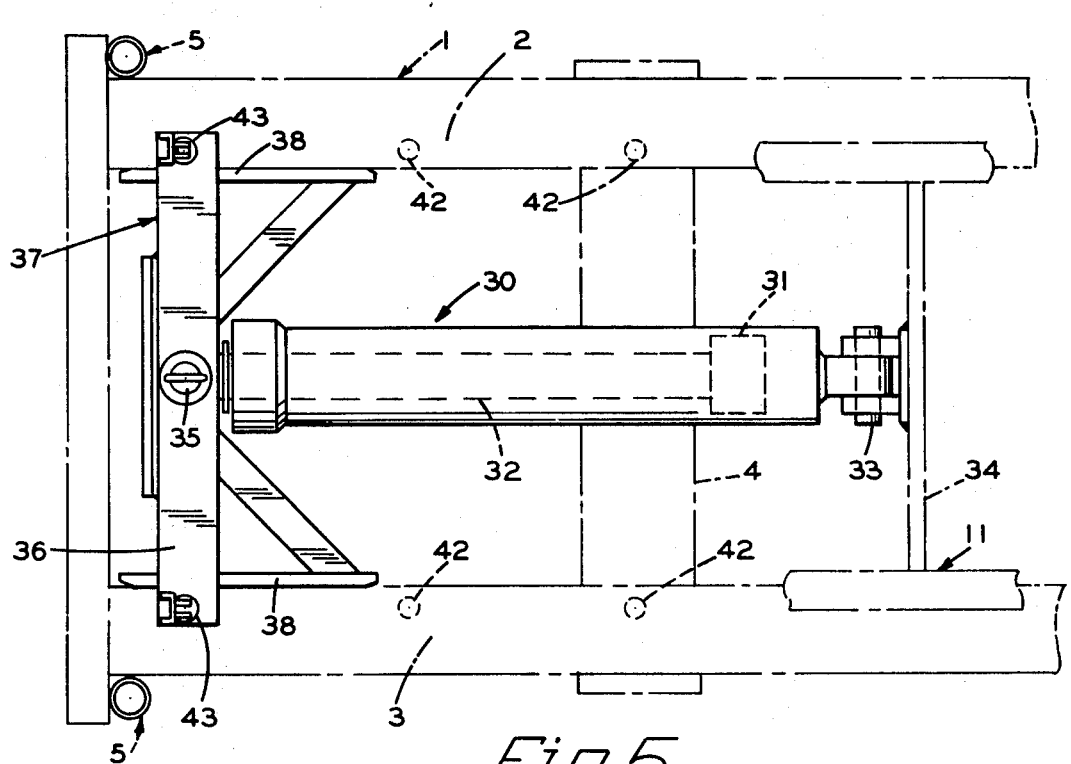
FIG. 5 is a detail plan of the portion of the apparatus of FIG. 4.
Figure 4:
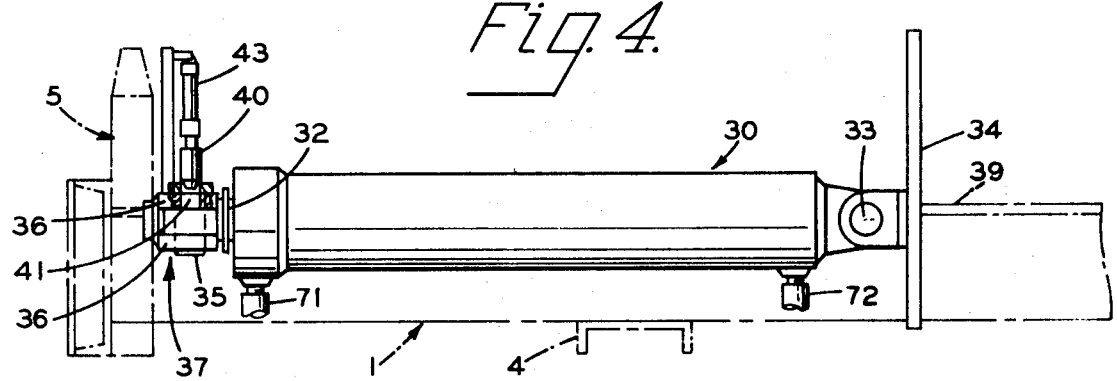
FIG. 4 is a detail side elevation to an enlarged scale of the crowd cylinder and associated parts, broken lines being used to indicate the carriage and the frame of the apparatus.
Figure 7:
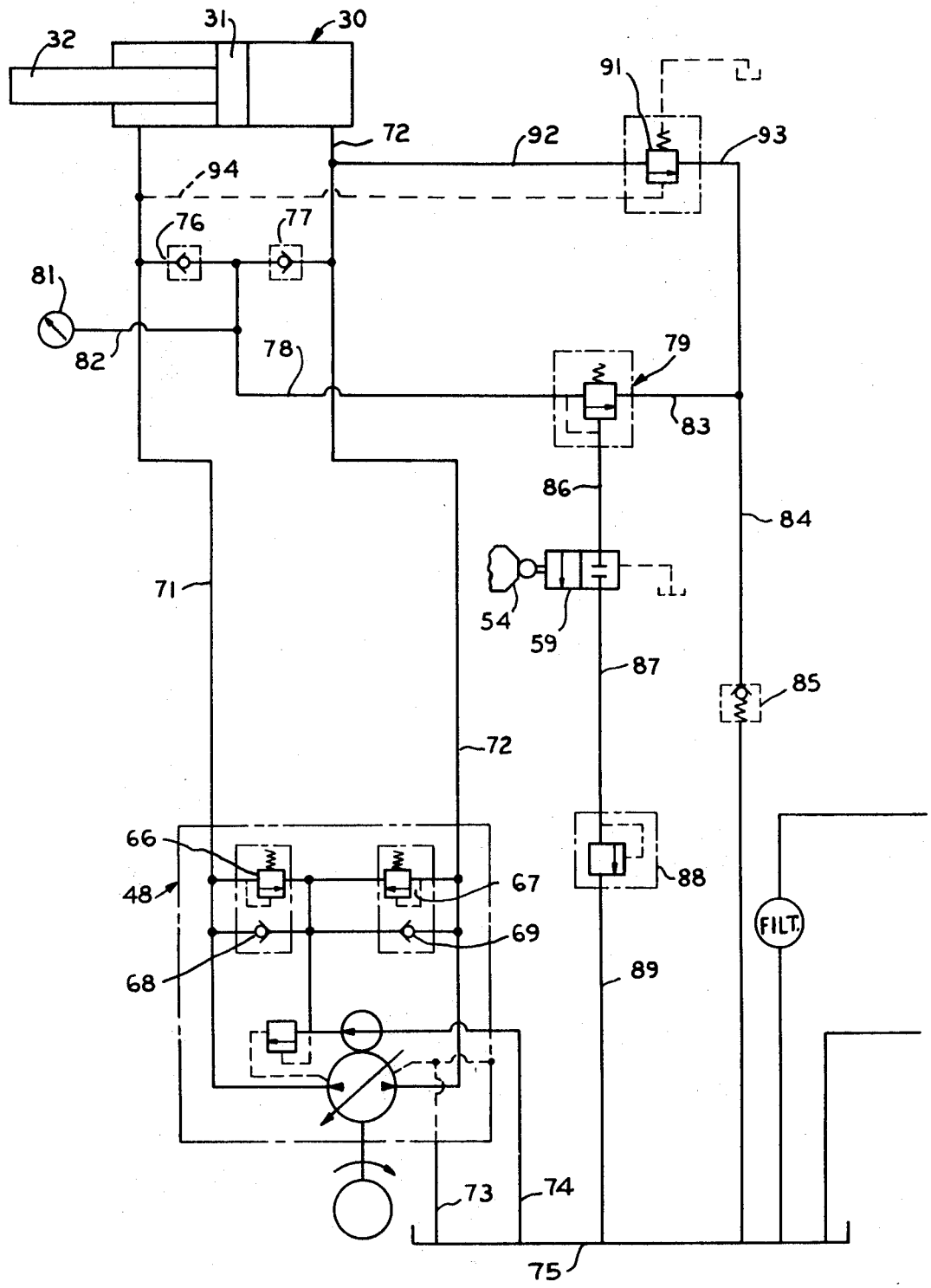
FIG. 7 is a diagram of a hydraulic system of the invention that may be employed to move the carriage of the apparatus of the previous figures.

Carriage 11 is moved forward and rearward as necessary or desirable by fluid motor means taking the form in this embodiment of a liquid actuated crowd cylinder 30 having a piston 31 and piston rod 32 connected at its blind end by a pin 33 to a crossmember 34 of carriage 11 (FIGS. 4, 5, 7). The piston rod extends rearward with its free end between, and connected by pin 35 to spaced upper and lower transverse members 36 of a crosshead 37 slidably carried by, and adapted to be fixed at different positions longitudinally of, the main frame 1. The opposite ends of the fluid cylinder and rod are thus pivotally connected between the carriage 11 and the crosshead 37 on the frame.

The members 36 of the crosshead 37 are fixed to guide members 38 that fit between and can slide along the inner surfaces of the members 2 and 3 of the main frame 1. The end portions of the members 36 of the crosshead extend over and under the top flanges 39 of the beams 2 and 3; the end portions of the upper crosshead member 36 also carry latching pins 40 that can be inserted through openings 41 in such end portions into selected ones of openings 42 in the top flanges of the side beams of the main frame to anchor the crosshead to the frame. While the pins 40 can be manually inserted and removed, preferably the crosshead carries hydraulic cylinders 43 that can lift the latching pins 40 out of and lower them into the openings 42 in the main frame when desired, which hydraulic cylinders are actuated by suitable known conventional means controlled by lever 44 on the carriage.

The distances between the centers of these openings 42 in the beams 2 and 3 are predetermined, and in any event are no greater than and preferably equal to, the length of the maximum stroke of piston rod 32. When latching pins 40 are inserted into a selected pair of openings 42 in the frame and the cylinder 30 is subjected to liquid under pressure so the piston rod 32 extends relative to the cylinder, the cylinder 30 and carriage 11 move forward to advance the auger driven by the carriage. After the carriage has traveled a predetermined distance, which usually involves penetration of the auger cutting head into the earth being drilled, extension of the piston rod is halted; the latching pins 40 are withdrawn from the holes 42 and piston rod 32 is retracted into the cylinder, moving the crosshead 37 forward on the main frame 1. When the crosshead is positioned so its latching pins 40 are above a selected pair of openings 42 in the frame located forward of the original holes, cylinders 43 are energized to insert pins 40 into such selected openings to anchor the crosshead to the main frame. The cylinder 30 is again energized to cause the piston rod 32 to extend, again moving carriage 11 forward, and the cycle may be repeated to move the carriage forward on the main frame 1 until the desired maximum travel has been achieved, usually the length of one of the sections making up auger A.

Thereafter, the carriage may be retracted as desired in stages on the main frame 1, by retracting piston rod 32 into cylinder 30 to cause carriage 11 to move rearward until the piston rod is completely retracted, then withdrawing pins 40 of crosshead 37 from the frame openings 42 in which they were seated, then extending the piston rod 32 until the crosshead 37 and its latching pins 40 reach a selected pair of rearward openings 42 in the frame, inserting pins 40 into such openings, again retracting the piston rod into the cylinder, and so on, until the crosshead 37 is anchored in its rearmost position by insertion of its pins 40 in the rearmost openings 42 of the frame. An additional auger section can then be inserted and connected in a known manner in the auger A between the driving head 28 and the rear end of the former rearmost auger section, if desired. The procedure previously described above can then be repeated to advance the cutting head to continue penetration. A foot-operated brake 45 may be used to aid in halting the carriage.

A conventional power takeoff 47 at the side of the engine 20 is utilized to operate a hydraulic pump 48, to be described and connected as indicated later to move the piston 31 in cylinder 30.

The hydraulic system for actuating the crowd cylinder 30 and for controlling the direction and speed of movement of the carriage is controlled by lever 51 of control assembly 52 mounted on the carriage of the machine.

Figure 6:
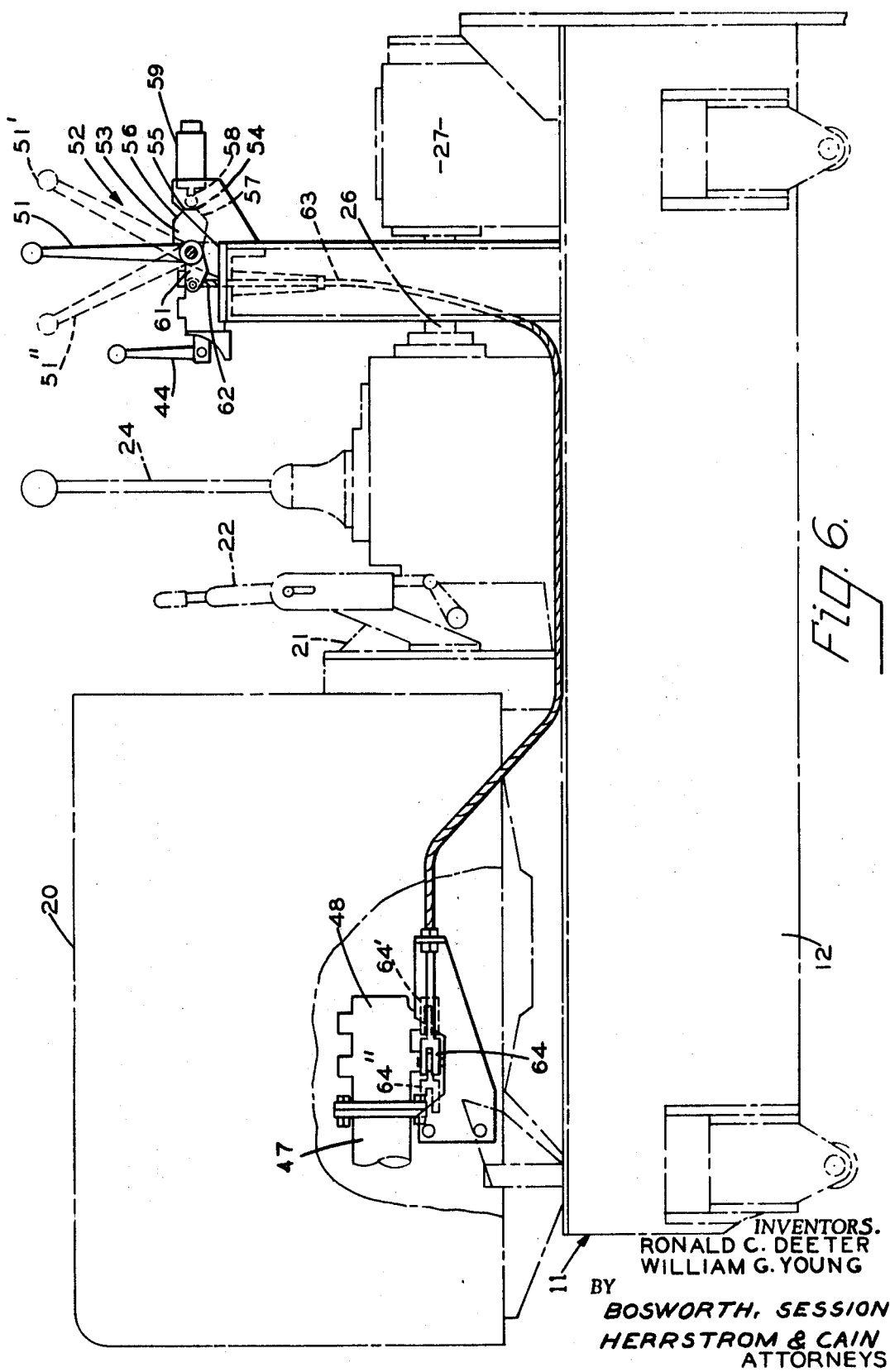
FIG. 6 is a detail showing the power and control means for the pump and that supplies liquid to the crowd cylinder to move the carriage forwardly and rearwardly.

As shown in FIG. 6, the control lever 51 is mounted for pivotal movement about a horizontal axis. It rigidly carries a laterally extending cam portion 53 having a camming surface 54 with a central portion 55 and side portions 56 and 57 diverging rearward from the central portion. Surface 54 is shaped, and is engaged by the outwardly biased plunger 58 of a pilot valve 59, as described later.

The lever 51 also has a bell crank portion 61 extending laterally opposite to cam portion 53, to which is fixed the end of a flexible push-pull cable 62 slidably mounted in flexible tubular conduit 63, the other end of which cable is connected to the pump control lever 64 of a conventional variable displacement hydraulic pump 48, which may be a commercially available variable displacement piston pump such as Model TA15–1A–10 manufactured by Vickers Division of Sperry Rand Corporation, Troy, Mich., in which movement of lever 64 varies the lengths of the strokes of the pump pistons to vary the displacement of the pump per revolution and hence vary the rate of flow of the pump. Movement of lever 64 to selected positions within its range designated by broken lines 64' and 64" respectively corresponding to positions 51' and 51", governs the direction of flow of hydraulic liquid, and the rate of flow of such liquid delivered by the pump.

In the diagram of FIG. 7 the pump 48 contains known relief valves 66 and 67 and replenishing check valves 68 and 69. The pump is adapted to discharge liquid to either of lines 71 and 72, line 71 communicating with the rod end of cylinder 30 while line 72 communicates with the blind end of that cylinder. The pump also communicates through lines 73 and 74 with oil reservoir 75, which also acts as a sump.

Commercially available check valves 76 and 77 respectively are connected to lines 71 and 72 communicating with the cylinder, and with a line 78 communicating with the inlet of a relief valve 79. Check valve 76 permits liquid to pass from line 71 to line 78, while check valve 77 permits liquid to pass from line 72 to line 78. A pressure gage 81 also is connected through line 82 to line 78.

Relief valve 79, which may be of a conventional ventable type such as a Vickers Model CS–03–H–20 relief valve, is normally closed but is set to open at a predetermined relatively high, preferably adjustable, pressure; preferably it is set to open at a maximum pressure lying between about 1500 p.s.i. to 4000 p.s.i. When opened, valve 79 discharges through line 83 to a line 84 communicating with reservoir 75 through a check valve 85. When closed valve 79 communicates through line 86 with pilot valve 59, which may be a commercially available type such as a Vickers C–552–E–pilot valve, controlled by the lever 51. Line 87 which is connected to line 86 by valve 59 when it is open, extends from valve 59 to another relief valve 88 adapted to open at a substantially lower pressure than relief valve 79. Preferably the pressure that opens relief valve 88 is also adjustable; preferably the valve is set to open at a predetermined pressure between about 500 p.s.i. and about 1300 p.s.i. Valve 88 may be a commercially available type, such as Vickers C–175–C–11 relief valve. When open, valve 88 communicates through line 89 with reservoir 75.

The system also includes a valve, sequence valve 91, such as commercially available Vickers Model RT–03–B3–22 valve, connected by line 92 to line 72 communicating with the blind end of cylinder 31. Valve 91 when opened communicates through line 93 with line 84 ahead of the inlet of check valve 85. Valve 91 also is connected by a sensing line 94 to line 71 connected to the rod end of cylinder 31. Valve 91 is set to open when a relatively low pressure, such as about 250 p.s.i., is developed in sensing line 94 when liquid is supplied under pressure by pump 48 through line 71 to move the piston 31 toward the blind end of the cylinder 30, to make possible proper discharge and return to the pump of the volume of liquid on the blind side of the piston that is in excess of the volume on the piston side of the piston which is smaller by reason of the space occupied by the piston rod. Preferably, check valve 85 is supplied and set at a still lower pressure, such as about 65 p.s.i., to insure that liquid can move in pump line 84 to reservoir 75, but not in the reverse direction.

The operation of the described apparatus in advancing and retracting the carriage 11 on the frame 1 by the crowd cylinder 30 is as follows.

Assume first that the crosshead 37 is anchored to the frame 1 in a desired position as described above, and that it is desired to advance the carriage and the auger A to cause cutitng head B to penetrate the earth to be drilled, that the engine 20 is operating and delivering power through the power takeoff 47 to the pump 48, and that the controls and transmission are set to cause the auger A and its head B to rotate.

When it is desired to cause the cylinder 30 to advance the carriage on the frame, the lever 51 (FIG. 6) is pivotally moved so its top moves forward. This pulls the flexible cable 62 and moves the control lever 64 of pump 48 forward to a position corresponding to the movement of the lever. This causes the liquid to flow from the pump through line 72 to the blind end of cylinder 30 at a rate determined by the length of the strokes of the pistons and cylinders of pump 48 established by the position of pump lever 64.

Meanwhile, such pivotal movement of control lever 51 moves cam surface 54 downward about the axis of lever 51, the camming surface being shaped to permit pin 58 of pilot valve 59 to move under its biasing force. The fluid passing through line 72 to the blind end of cylinder 30 forces its piston toward the rod end of the cylinder and thus forces the carriage forward against resistance encountered by the rotating cutting head driven by engine 20. The pressure of the fluid in line 72 is indicated from gage 81, which is located so it can be read by an operator stationed near the other controls of the apparatus.

By appropriate forward movement of the lever 51, the operator can adjust the displacement and hence the output rate of the pump 48, and thus can apply whatever force he believes is desirable to the piston 31 in cylinder 30, within the limits to which the system is set, using the gage pressure indications; therefore he can apply a penetrating force on the cutting head corresponding to the pressure of the liquid. Camming surface 54 is so shaped that the valve 59 does not open at the low rates of flow from pump 48 that occur when the lever 51 is moved forward slightly; therefore, if the pressure in line 72 should tend to exceed the limit to which relief valve 79 is set, the valve will open and vent liquid through lines 83 and 84, and check valve 85 to reservoir 75 to maintain the pressure at the valve pressure limit. This insures that even at high pressures, as limited by relief valve 79 when valve 59 is closed, the power output to drive pump 48 that is supplied by the power takeoff 47 from engine 20 will not exceed a predetermined limit within the capabilities of the equipment, since the output of the pump is at a low rate of flow.

Furthermore, the camming surface 54 is also so shaped that when the lever 51 is tilted to the vicinity of its maximum forward position to adjust pump 48 to provide higher rates of liquid output, the plunger 58 of pilot valve 59 will move outwardly of the valve under the plunger biasing force, to open the valve and connect line 86 to line 87 connected to relief valve 88. Therefore at the higher pump output rate caused by such more tilted position of lever 51, relief valve 88 will open if the pressure in line 72, which is also the pressure in lines 78, 86 and 87, tends to exceed the limit to which the relief valve 88 is set, thus causing relief valve 79 to open and discharge liquid through line 83 at a lower pressure corresponding to the limit established by valve 88. Therefore, even at high rates of liquid output from pump 48, the relief pressure to which valve 88 is set and the shape of camming surface 54 are such that the maximum power output drawn from engine 20 through power takeoff 47 will not exceed a predetermined limit within the capabilities of the power take-off.

When the carriage is retracted on frame 1 by operation of crowd cylinder 30, the high forces that are present when the auger penetrates the earth are not encountered. Nevertheless the hydraulic system illustrated provides the same precautions against excessive power withdrawals even if high force supply should be encountered.

When it is desired to move the carriage rearwardly by operation of cylinder 30, the lever 51 is moved rearwardly. This causes the operating lever 64 of the pump 38 to move rearwardly, directing fluid under pressure through line 71 to the piston end of cylinder 50. Camming surface 54 is so shaped that at low rates of output of liquid from pump 48 when the handle 51 is slightly tilted rearward, the pilot valve 59 remains closed. Unless the pressure in line 71 exceeds the limit to which relief valve 79 is set, the relief valve also remains closed and the full pressure from the pump at the low output is delivered to the cylinder at the rod end. The pressure can be read by the operator from gage 81.

Camming surface 54 is also so shaped that when the lever 51 is moved rearwardly to a greater distance to cause the displacement of the pump to increase to provide a high output of liquid under pressure through line 71, the camming surface 54 causes the pilot valve 59 to open, thus connecting line 71 with relief valve 88 through line 78, valve 79, pilot valve 59, and line 87. In the event that the pressure in line 71 should tend to exceed the pressure at which valve 88 is set, the valve will open and vent fluid through line 89 to the reservoir. This vents relief valve 79 and causes it to open at the lower pressure setting of valve 88. Thus the maximum power drawn by pump 48 will be within a predetermined limit within the capabilities of the power takeoff.

It is highly unlikely that on retraction the pressure will ever tend to exceed the pressure at which valve 79 is set but if it does, the valve will vent liquid through lines 83 and 84 to the reservoir to prevent excessive pressure, as occurs on advance of the carriage.

As piston 31 moves toward the blind end of the cylinder 30, as on retraction of the carriage, the fluid between the piston and the blind end of the cylinder, which at any time exceeds in volume the fluid between the piston and the rod end of the cylinder because of the space occupied by the piston rod, is discharged through line 72 back to pump 48, the excess being vented through valve 91 through lines 93 and 84 to the reservoir when the pressure in line 71 exceeds the amount for which valve 91 is set.

Furthermore, since the amount of fluid discharged through line 71 from the cylinder to the pump is less than that supplied through line 72 by the pump to the cylinder as the piston moves toward the rod end of the cylinder 30, the additional amount required by the pump is supplied through line 74 from the reservoir.

In the system described above the valve 79 limits to a high pressure within the capabilities of the apparatus, the pressure of liquid supplied at a low rate to the cylinder 30, and valve 88 limits to a lower pressure, substantially different from the pressure limit of valve 79, the pressure of liquid delivered at a substantially higher rate to cylinder 30.

The embodiment of the invention described above therefore makes possible advancement and retraction of the carriage without at any time exceeding a predetermined power requirement for the pump, even though on advancement the carriage should be exerting thrust on an auger that is drilling hard rock or other material providing considerable resistance to drilling while making possible desired control over the rate of penetration on advancement of the carriage, and permitting relatively rapid retraction.

On advancement of the carriage to cause penetration of the auger, oil or hydraulic liquid may be directed into the crowd cylinder 30 at a controlled rate that corresponds to the penetration rate of the auger, without exceeding a cylinder pressure which is within the capabilities of the apparatus or power system and without exceeding a predetermined maximum power requirement.

There is no pumping of any hydraulic liquid at high pressure and at a high rate in excess of liquid delivered to the crowd cylinder that can create excessive heat that must be removed by complicated cooling means with a substantial loss of energy. There is no use of excessive power by the pump, and withdrawal of excessive power from a main engine if the pump is driven by a power takeoff from such engine. Furthermore, the pressures that are utilized and the power that is utilized can at all times be kept within the capabilities of the apparatus, without harmful consequences that could arise if excessive pressures or excessive power is used.

It is apparent that the above embodiment is illustrative and that various changes can be made in such embodiment without departing from the spirit of the invention.

It is intended that the patent shall cover by suitable expression in the appended claims whatever features of patentable novelty reside in the invention.

We claim:

1. Apparatus of the character described comprising a frame; a carriage movable along said frame, said carriage being adapted to support and drive auger means; fluid energizable drive means operating between said carriage and said frame for moving said carriage along said frame; fluid pump means of the variable displacement type having adjustment means to adjust the rate at which fluid is discharged from said pump means, said pump means being capable of only a maximum fluid power output based on rate and pressure of fluid discharged from said pump means; conduit means suplying fluid under pressure from said pump means to said drive means; control means actuated independently of the pressure in the fluid discharged from said pump means for controlling said adjustment means of said pump means to adjust the rate at which fluid is discharged from said pump means through said conduit means; higher pressure relief means connected to said conduit means for relieving pressure in said conduit means if it exceeds a predetermined first maximum pressure at a lower rate of discharge of fluid from said pump means; and lower pressure relief means connected to said conduit and controlled by said control means for relieving pressure in said conduit means if it exceeds a predetermined maximum second pressure lower than said first maximum pressure at a higher rate of discharge from said pump means, whereby said control means and said pressure relief means cause said fluid supplied by said pump means at any rate of discharge between said lower and higher rates of discharge always to be at a pressure below that which would cause said pump means to exceed its maximum fluid power output 2. The apparatus of claim 1 in which said control means is manually actuatable.

3. The apparatus of claim 1 in which said control means and said pressure relief means operate so said first predetermined maximum pressure is a relatively high pressure and said lower rate of discharge is at the lowest rate of discharge from said pump means, and in which said second predetermined maximum pressure is a pressure substantially lower than said first predetermined maximum pressure and said second rate of discharge is substantially higher than said first rate of discharge.

4. The apparatus of claim 1 in which said drive means is a fluid operated cylinder having a piston therein with a rod, said cylinder and said piston rod being connected between said carriage and said frame.

5. The apparatus of claim 1 in which said fluid is liquid.

6. The apparatus of claim 1 in which essentially all fluid discharged from said pump passes to said drive means to energize it while the pressure of the liquid discharged from said pump remains below a predetermined pressure.

7. The apparatus of claim 1 comprising means to indicate the pressure of liquid discharged from said pump and supplied to said drive means, and in which apparatus said means for controlling said adjustment means on said pump is manually controllable, whereby an operator can control the rate of discharge of fluid discharged from said pump to said drive means in accordance with the pressure indicated by said indicating means to maintain the pressure of discharge fluid passing to said drive means below a predetermined pressure.

8. Auger apparatus comprising a frame; a carriage movable along said frame, said carriage being adapted to support and drive auger means; liquid operable drive means operating between said carriage and said frame for moving said carriage along said frame; a liquid pump of the variable displacement type having adjustment means to adjust the rate at which liquid is discharged from said pump; conduit means connecting said pump to said drive means to permit passage of liquid under pressure from said pump to said drive means to cause said carriage to move on said frame; control means actuated independently of the pressure of the liquid discharged from said pump for controlling said adjustment means of said pump means to control the rate at which liquid is discharged from said pump to said drive means to move said carriage along said frame; and pressure relief means connected to said conduit means and responsive to said control means for relieving the pressure of the liquid discharged from said pump and passing through said conduit means to said drive means if said pressure exceeds a first higher predetermined maximum pressure when said pump is discharging liquid at a lower rate and if said pressure exceeds a second lower predetermined pressure when said pump is discharging liquid at a higher rate, said variable discharge pump discharging to said drive means essentially all liquid discharged from said pump except that which is discharged from said pressure relief means when the pressure of the liquid discharged from said pump to said drive means exceeds either of said predetermined maximum pressures.

9. The apparatus of claim 8 comprising first pressure relief means operating to relieve pressure exceeding said first predetermined maximum pressure, and second pressure relief means operating to relieve pressure exceeding said second predetermined maximum pressure at a rate of discharge of liquid from said pump to said drive means that is higher than the rate at which fluid is discharged from said pump to said drive means when said first mentioned pressure relief means is operating to relieve pressure.

10. The apparatus of claim 9 comprising conduit means that connects said first mentioned pressure relief means, when not operating to relieve pressure, to said second pressure relief means, and in which apparatus said control means operates on said conduit to keep said conduit closed at a lower rate of discharge from said pump and to open said conduit at a higher rate of discharge from said pump.

11. The apparatus of claim 8 comprising pressure indicating means that indicates the pressure of the liquid discharged from said pump to said drive means, to permit an operator to control said control means to maintain pressure in said indicating means below a predetermined pressure.

12. The apparatus of claim 8 comprising power means for driving said pump, and in which the maximum pressure at which said pressure relief means is set to relieve pressure and the rate of discharge of said pump are correlated to insure that the power supplied by said power means to drive said pump is below a predetermined maximum and within the capabilities of the power means.

13. The apparatus of claim 10 comprising power means for driving said pump, and in which the maximum pressure at which said first-mentioned pressure relief means acts to relieve pressure and the rate at which said pump discharges fluid to said drive means when said second conduit means between said first and second pressure relieving means is closed are correlated to insure that the power supplied by said power means to drive said pump is below a predetermined maximum and within the capabilities of said power means, and in which the pressure at which said second pressure relief means act to relieve pressure and the rate at which said pump discharges fluid to said cylinder means when said second conduit means between said first and second pressure relief means is open are correlated to insure that the power supplied by said power means to drive said pump is also below a predetermined maximum within the capabilities of said power means.

14. The apparatus of claim 12 comprising a power source, and in which said power means is power takeoff means for taking off power from said power source and supplying it to said pump.

15. The apparatus of claim 14 in which said power source, said power takeoff means, and said pump are mounted on said carriage, and said power source rotates the auger means.

16. The apparatus of claim 13 comprising a power source, and in which said power means is power takeoff means for taking off power from said power source and supplying it to said pump.

17. The apparatus of claim 16 in which said power source, said power takeoff means and said pump are mounted on said carriage, and said power source rotates the auger means.

References Cited

UNITED STATES PATENTS

| | | | |
|---|---|---|---|
| 2,721,057 | 10/1955 | Brown-Coombes | 173—154 |
| 2,976,942 | 3/1961 | Pitcher | 173—154X |

FOREIGN PATENTS

| | | | |
|---|---|---|---|
| 946,189 | 1/1964 | Great Britain | 173—4 |

ERNEST R. PURSER, Primary Examiner

U.S. Cl. X.R.

173—154